April 9, 1946.  M. SUMMERFIELD ET AL  2,398,125

MOTOR

Filed May 8, 1943   2 Sheets-Sheet 1

INVENTORS
DAVID A. YOUNG
MARTIN SUMMERFIELD
BY
Christie & Angus
ATTORNEYS.

UNITED STATES PATENT OFFICE 2,398,125

MOTOR

Martin Summerfield, Pasadena, and David A. Young, Arcadia, Calif., assignors to Aerojet Engineering Corporation, Azusa, Calif., a corporation of Delaware Application May 8, 1943, Serial No. 486,220

6 Claims. (Cl. 60—35.6)

Our invention relates to a jet motor unit, and since it finds particular utility in the form adapted for mounting an air jet motor, containers supplying fluid thereto, fluid lines, and control devices in the nacelle of an airplane, such an embodiment is hereinafter described as illustrative of our invention, it being understood that our invention is not restricted to such application.

In installing a jet motor in an aircraft, it is highly desirable that the motor, containers of the fluid therefor, the supply lines, and the controls should be provided in a unit to facilitate installation and removal. It is an object of our invention to provide such a unitary structure.

Among the other objects of our invention are the provision of such a unit which is of extremely light weight, yet capable of resisting deformation responsive to the thrust of the jet motor in operation; the provision of such a unit having containers for the fluids supplied to the jet motor and driving or expelling fluid, which containers are of extremely light weight but so formed as to be sufficiently resistant to internal pressure; the provision of means for connecting such containers to the unit which will prevent movement of the containers relative to the unit, responsive to any movements of the airplane, and which avoid the application to the containers of damaging localized stresses; the provision of such a unit in which the center of gravity of the entire unit is located as near the overturning axis of the wings of the airplane as possible, thereby minimizing the moment of the unit about such axis; and the provision of such a unit in which the center of gravity of the unit when the containers are filled and the center of gravity of the unit when the containers are empty are substantially the same, thereby avoiding variations in the moment of the unit about the overturning axis of the wings of the airplane as the result of operation of the jet motor.

An embodiment of our invention capable of providing the foregoing advantages and others is described in the following specification, which may be more readily understood by reference to the accompanying drawings, in which.

Figure 1:
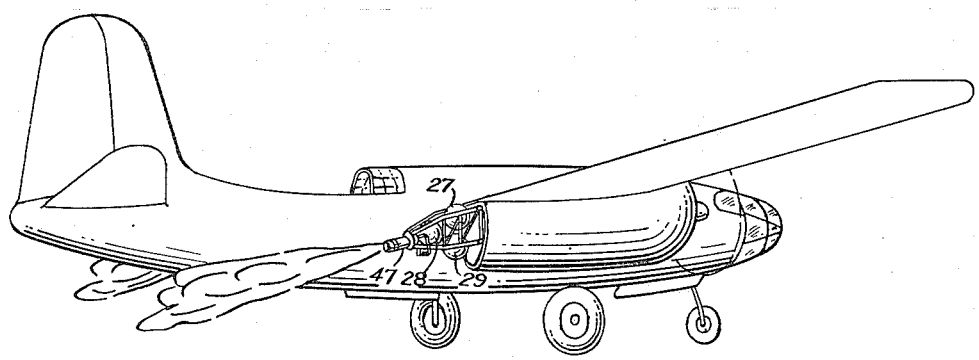
Fig. 1 is a perspective view of the jet motor unit of our invention mounted on an airplane.
Figure 2:
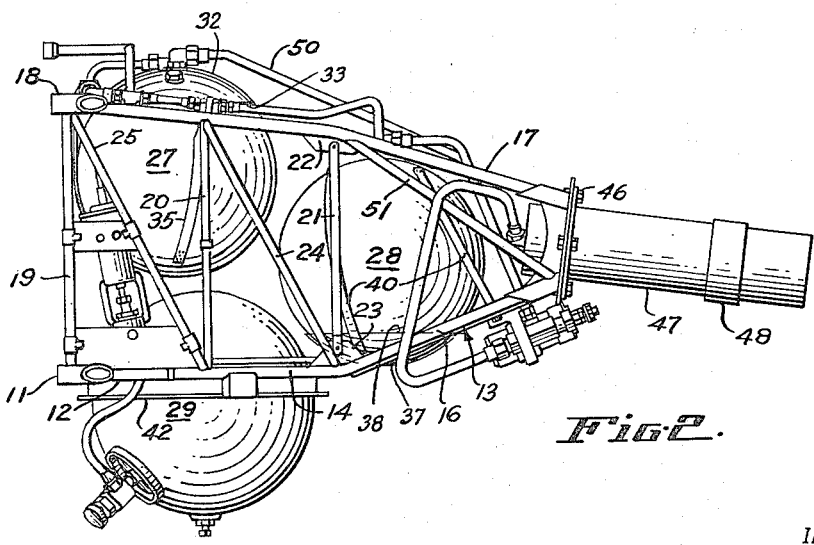
Fig. 2 is an elevational view of such jet motor removed from the airplane and resting upon a support.
Figure 3:
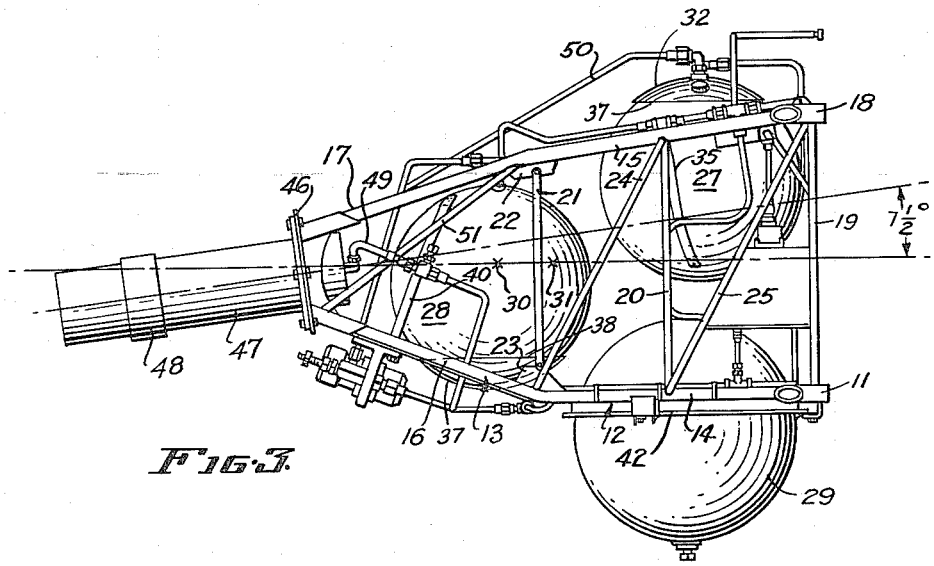
Fig. 3 is a side elevational view of such unit.
Figure 4:
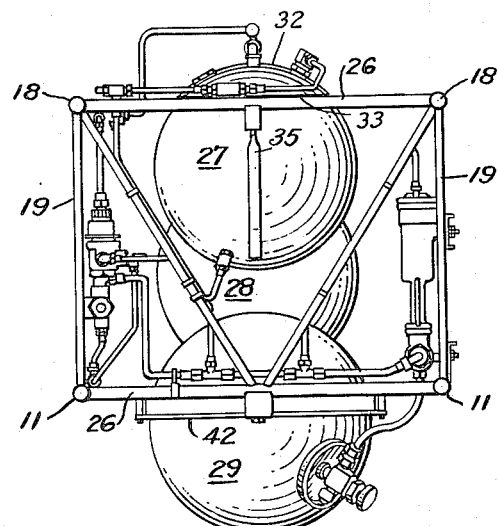
Fig. 4 is a front elevational view of such unit.

Referring to the drawings, which are for illustrative purposes only, the numeral 11 indicates a supporting frame which includes a forward section 12 and a rearward section 13. The forward section 12 includes two rearwardly converging lower legs 14 substantially horizontal and two rearwardly converging upper legs 15 declining from the horizontal rearwardly. As illustrated in Figs. 3 and 4, the forward portion 12 is rectangular in cross section diminishing rearwardly in its vertical and horizontal dimensions, and the upper legs 15 are slightly greater in length than the lower legs 14.

The rearward portion 13 of the supporting frame 11 likewise includes two rearwardly converging lower legs 16 and two rearwardly converging upper legs 17, the legs 16 and 17 converging rearwardly relative to each other, and the upper legs 17 declining rearwardly from the horizontal at a greater angle than the upper legs 15. Each of the upper legs 15 is preferably integral with one of the upper legs 17, and each of the lower legs 14 is preferably integral with one of the lower legs 16. We prefer to form the legs 14 to 17 inclusive from metal tubing cylindrical in form because of the great strength and light weight of such tubing and the facility with which it may be bent to the desired shape between the portions 12 and 13.

The upper legs 15 of the portion 12 are bent adjacent their forward ends to form substantially horizontal end portions 18. The end portions 18 of the legs 15 are connected to the lower legs 14 by vertical rods 19. Likewise, vertical rods 20 connect the upper legs 15 to the lower legs 14 substantially at the middle of the forward portion 12. Similarly, vertical rods 21 connect depending brackets 22 secured to the upper legs 15 to upwardly extending brackets 23 secured to the lower legs 14 at the bent portions of such integral legs 14, 16, and 15, 17. Diagonal braces 24 are provided connecting the brackets 23 and the upper legs 15 adjacent their connection to the vertical rods 20, and diagonal braces 25 connect the lower legs 14 adjacent their connection to the vertical rods 20 to the end portions 18 of the upper legs 15 adjacent their connection to the vertical rods 19. Horizontal rods 26 connect the lower legs 14 to each other and the upper legs 15 to each other adjacent the connection of such legs to the vertical rods 19. The vertical rods 19 to 21 and the diagonal braces 24 and 25 and the horizontal rods 26, all of which are preferably tubular in form, stiffen the supporting frame 11 against deformation responsive to the stresses imposed thereon by the jet motor during its operation.

Indicated by the numerals 27, 28, and 29 are containers for a liquid oxidizing agent, a liquid fuel, and a compressed inert gas, respectively. These containers are spherical in form because such shape confines the greatest volume and provides the greatest resistance to internal pressure with the minimum metal. The containers 27 and 28 are made of metal as thin as possible for the comparatively low pressure which they are required to withstand, and the container 29 is made of somewhat thicker metal to withstand the greater pressure of the gas confined therein. We have employed successfully three such containers of the same size.

As illustrated in the drawings, the container 29 is positioned as close to the forward end of the supporting frame 11 as possible, the container 27 is arranged directly above the container 29, and the container 28 is disposed as close to the containers 27 and 29 as possible, the centers of the three containers defining an equilateral triangle. By such disposition of the containers 27, 28, and 29, the unit is made as compact as possible with its center of gravity as close as possible to the front of the supporting frame 11.

Likewise, this arrangement of the containers 27, 28, and 29 places the center of gravity of the unit at the point indicated by the numeral 30 when the containers are filled with fluids and at the point indicated by the numeral 31 when the containers are empty, so that the center of gravity of the unit remains substantially constant during the operation of the jet motor, thus maintaining substantially constant the turning moment of the unit about the overturning axis of the wings of the airplane.

Connecting the upper legs 15 is a plate 32 provided with a downwardly opening concave portion 33 of somewhat larger diameter than that of the spherical container 27. The container 27 is cushioned in this concave portion 33 by a layer of cushioning material which may with advantage be Koroseal or other suitable elastic not acted upon by the oxidizing agent supplied to the container 27. The container 27 is secured in the concave portion 33 against this layer by a plurality of metal straps 35 extending around the container 27 and secured by bolts to the plate 32.

In a similar manner, a plate 37 is secured to the lower legs 16 of the rearward portion 13 and provided with an upwardly concave portion 38 for the reception of a cushioning layer formed of Neoprene or other resilient material not acted upon by the contents of the container 28. The container 28 is retained against this layer in the concave portion 38 by a plurality of metal straps 40 extending around the container 28 and secured to the plate 37 by bolts 41.

The numeral 42 indicates a hoop or ring which is secured to the lower legs 14 of the forward portion 12 with its axis vertically disposed. The ring 42 is made of a diameter somewhat greater than the diameter of the containers and is provided with brackets secured to lugs on the container 29.

The upper legs 17 of the rearward portion 13 extend rearwardly somewhat beyond the lower legs 16, the extremities of the legs 16 and 17 being connected by an end plate 46. Extending through the end plate 46 is a cylinder 47 having therein intermediate its ends a jet motor 48 of a generally cylindrical shape. The motor 48 is supplied by a pipe 49 with fuel having the properties of aniline from the fuel container 28 and by a pipe 50 with an oxidizing agent having the properties of nitric acid from the container 27, the fuel and oxidizing agent being driven from such containers by the supply thereto of an inert gas such as nitrogen under pressure from the container 29 and being spontaneously combustible in the jet motor 48, as more fully disclosed in copending application Serial No. 486,236, filed May 8, 1943. Conduits are provided for connecting the container 29 to the containers 27 and 28, there being suitable valves in such conduits and the pipes 49 and 50 by which the rate of supply of the oxidizing agent and fuel to the jet motor 48 may be controlled.

The means of connecting the containers 27 and 28 to the supporting frame 11 insures against their movement relative to the supporting frame while avoiding the imposition of localized damaging stresses to such thin walled containers responsive to movement of the airplane and the inertia of such containers and their contents. The thicker walls of the container 29 required by the greater pressure existing therein permit the container 29 to be secured to the supporting frame supported by brackets and lugs and bolts without danger of damage from such stresses.

The forward ends of the legs 14 and 15 are secured in any suitable manner to a vertical panel in the nacelle of an airplane. The stresses imposed upon the supporting frame 11 due to the thrust of the jet motor 48 when in operation are applied substantially axially of the legs 16 and 17 and 14 and 15. The plates 32 and 37 and ring 42, together with the vertical rods 19, 20, and 21, and the diagonal braces 24 and 25 and a diagonal brace 51 connecting the rearward end of each lower leg 16 to one of the brackets 22, retain the supporting frame 11 in proper form effectively resisting the inertia and thrust forces tending to distort it applied by the jet motor 48 and the containers 27, 28, and 29 and their contents.

While that embodiment of the invention hereinbefore described provides the advantages primarily stated, it will be obvious to those skilled in this art that various modifications and alterations thereof may be made without departing from our invention which is defined by the scope of the claims which follow.

We claim as our invention:

1. A self-contained jet thrust motor unit for use in an airplane comprising, a thrust motor, a plurality of tanks for containing liquid propellants for said motor, fluid feed connections between said tanks and said motor, and a frame for supporting said motor and said tanks, said frame comprising a plurality of rigid legs converging rearwardly to the front end of said motor, and extending frontward from said motor in the general direction of the thrust from the motor, reinforcing strips extending between said legs, and attaching members for attaching said tanks to said frame just in front of the motor, said attaching members comprising concave plates fastened to the frame, the concave portion of each plate being fitted to a respective tank, and a strap attached to each plate and extending around the associated tank.

2. A self-contained jet thrust motor unit for use in an airplane comprising, a thrust motor, a plurality of rigid legs diverging away from said motor and attached endwise to said motor in the direction of the reaction thrust from said motor, the ends of said legs remote from the motor being adapted for fastening to the aircraft, a plurality of cross struts interconnecting the legs and maintaining them in rigid position, and a plurality of fluid tanks for supplying said motor, situated closely together and fastened to said legs in front of said motor, at least one of the tanks being fastened by a plate attached to two of the legs, said plate having a concave portion fitted to its associate tank, with a strap fastened to the plate extending around the tank.

3. Apparatus according to claim 2 in which the tanks are located substantially within the framework of the legs and cross struts.

4. In combination a jet thrust motor and a plurality of spherical fluid tanks for supplying propellant material to said motor, a supporting frame comprising a plurality of rigid legs attached to and divergent from the chamber in the general direction of the reaction thrust of the motor, the ends of the legs removed from the motor and adapted for fastening to an airplane, rigid bracing struts interconnecting the four legs, and means for fastening the tanks closely together substantially within the frame work of legs and struts between the motor and the airplane, said fastening means comprising plates fastened to the frame, each plate having a concave portion fitted to one of the tanks, and a strap attached to each plate and extending around the associated tank to hold it in position.

5. Apparatus according to claim 4 in which the tanks are three in number, one of the tanks being located directly in front of the combustion chamber and the other two tanks being located between said one tank and the airplane.

6. Apparatus according to claim 4 in which there are at least three of said tanks, at least one of the tanks having a portion extending outside the supporting frame, and a ring circumferentially around the last mentioned tank, said ring being fastened to two of the legs and to the said last mentioned tank.

MARTIN SUMMERFIELD.
DAVID A. YOUNG.